(12) United States Patent
Pasanen et al.

(10) Patent No.: US 7,386,036 B2
(45) Date of Patent: Jun. 10, 2008

(54) WIRELESS MULTI-HOP SYSTEM WITH MACROSCOPIC MULTIPLEXING

(75) Inventors: Pirjo Pasanen, Vantaa (FI); Olav Tirkkonen, Helsinki (FI)

(73) Assignee: Spyder Navigations, L.L.C., Wilmington, DE (US)

( * ) Notice: Subject to any disclaimer, the term of this patent is extended or adjusted under 35 U.S.C. 154(b) by 737 days.

(21) Appl. No.: 10/749,662

(22) Filed: Dec. 31, 2003

(65) Prior Publication Data

US 2005/0141593 A1  Jun. 30, 2005

(51) Int. Cl.
*H04B 3/36* (2006.01)
*H04B 7/14* (2006.01)
(52) U.S. Cl. .......................... 375/211; 455/15; 370/293
(58) Field of Classification Search ............... 375/130, 375/211, 212; 455/7, 15, 16; 370/279, 293
See application file for complete search history.

(56) References Cited

U.S. PATENT DOCUMENTS

| | | | |
|---|---|---|---|
| 5,345,599 A | 9/1994 | Paulraj et al. | 455/49.1 |
| 5,913,168 A * | 6/1999 | Moreau et al. | 455/441 |
| 6,067,290 A | 5/2000 | Paulraj et al. | 370/329 |
| 6,496,546 B1 * | 12/2002 | Allpress et al. | 375/316 |
| 6,567,378 B1 * | 5/2003 | Yuan et al. | 370/235 |
| 7,184,703 B1 * | 2/2007 | Naden et al. | 455/10 |
| 7,218,891 B2 * | 5/2007 | Periyalwar et al. | 455/13.1 |
| 2001/0036810 A1 * | 11/2001 | Larsen | 455/11.1 |
| 2002/0173310 A1 * | 11/2002 | Ebata et al. | 455/445 |
| 2003/0165127 A1 * | 9/2003 | Fujiwara et al. | 370/335 |
| 2004/0131025 A1 * | 7/2004 | Dohler et al. | 370/328 |
| 2004/0156339 A1 * | 8/2004 | Urquhart et al. | 370/334 |
| 2005/0186982 A1 * | 8/2005 | Chen et al. | 455/522 |

FOREIGN PATENT DOCUMENTS

WO  WO 03/003672  1/2003

OTHER PUBLICATIONS

Multi-hop Radio Access Cellular Concept for Fourth-Generation Mobile Communication System, Yamao et al., Kyoto University, PIMRC 2002, 5 pgs.
Aspects for the integration of ad-hoc and cellular networks, 3rd Scandinavian Workshop on Wireless Ad-hoc Networks, Stockholm, May 6-7, 2003, Cristache et al., Germany.

(Continued)

*Primary Examiner*—Tesfladet Bocure (57) ABSTRACT

A method, device, and system in which radio links between relays and users are optimized separately from the links between relays and base stations and in which multiple simultaneous data streams between relays and base stations are created. The system includes transceivers of at least three kinds with two kinds of radio interfaces. The first kind of transceiver, a base station (BS), is connected to the core network with a link of wire line quality. The second kind, a relay station (RS), is connected to the BS with a first radio interface, and to the third kind, the user equipment (UE), with a second radio interface. The first and second radio interfaces can operate, at least in part, using the same frequency bandwidth. The UE can also connect directly to the BS using the second radio interface if the BS is closer than any RS.

13 Claims, 4 Drawing Sheets

OTHER PUBLICATIONS

Exploiting Macrodiversity in Dense Multihop Networks and Relay Channels, Valenti et al., 2003, IEEE, United States, pp. 1877-1882.

A Theoretical Characterization of the Multihop Wireless Communications Channel with Diversity, Boyer et al., 2001 IEEE, Canada, pp. 841-845.

*Multi-Hop Wireless Link System for New Generation Mobile Radio Access Networks*, Toru Otsu, Yuji Aburakawa and Yasushi Yamao, IEICE Trans. Commun. vol. E85-B, No. 8, Aug. 2002 (pp. 1542-1551).

* cited by examiner

WIRELESS MULTI-HOP SYSTEM WITH MACROSCOPIC MULTIPLEXING

FIELD OF THE INVENTION

The present invention relates generally to high data rate wireless transmission systems and methods. More particularly, the present invention relates to a wireless multi-hop system with macroscopic multiplexing.

BACKGROUND OF THE INVENTION

As is known, engineers and scientists strive to develop wireless communication systems that achieve high data rates at relatively low costs. High data rates are often attainable by design but cannot be implemented because costs are prohibitive.

In fourth-generation wireless systems (known as "4G" systems), capacities of 1 Gbps for a local area and 10 Mbps for wide area coverage have been envisioned. However, even with very wide bandwidths on the order of 100 MHz, the spectral efficiencies needed for these capacities are extremely high. One way of achieving these spectral efficiencies is the use of multiple antennas to transmit and receive multiple simultaneous data streams, i.e. MIMO (Multiple Input Multiple Output) transmissions. Also, due to lack of free spectrum in the lower frequencies, carrier frequencies around 5 GHz have been discussed. Even if the spectral efficiency requirements can be fulfilled, though, such systems would still have short ranges, due to the attenuation of high frequency signals. This combined with the limitations on transmit power and the requirements for high data rates, make communication cell ranges small, thus increasing the overall cost of the network. To combat the problem of small cell ranges, researchers have proposed the use of a multi-hop network architecture. For example, Otsu, Aburakawa, and Yamao discuss multi-hop systems in "Multi-hop wireless link system for new generation mobile radio access networks," IEICE Trans. Comm., Vol. E85-B, No. 8, Aug. 2002. Multi-hop architecture refers to the use of relay stations, without connection to fixed network, in addition to the normal base stations. Provided that the relays can be made considerably cheaper than normal base stations, such an arrangement may help with the range problem.

Even assuming that such multi-hop relays are able to use higher order modulations than the mobile stations, the combination of very high data rates and wide area coverage is still a problem. Multiple antennas can be used at the relays to increase the range to the next relay or base station or to increase the data rate, but to achieve both simultaneously is not an easy task. Capacity of the channel gives the maximum data rates which are possible to transmit reliably over the channel. However, in practical systems, a discrete set of modulations are used, and the maximum data rate can be limited by the modulations rather than the capacity. In particular, higher order modulations, such as M-QAM (quadrature amplitude modulation), where the cardinality of the modulation M is high, may not be used in practical systems. As the cardinality of the modulation increases the transmission gets less reliable. This can be compensated either by increasing the transmit power or by using a more complex receiver. But since the transmit power is limited and the cost of implementation of the receiver needs to be kept as low as possible, there is a strict upper limit for the cardinality of the modulation.

As an example of the contradicting requirements of high data rate and long range, consider a user equipment (UE) device having four transmit antennas in propagation conditions which allow for spatial multiplexing with three parallel streams. Assuming that the highest order modulation possible is 16-QAM, i.e. 4 bits/stream, the total data rate is 12 bits per channel use. Between relay and base stations, higher order modulations may be possible, such as a 128-QAM transmission. However, 128-QAM corresponds to only 7 bits/stream, meaning that at least two streams would be needed to transmit the same information between the relay and base station. Therefore, such a relay topology would require multiple stream transmission between all relay stations in a cell and the base station. Such a topology may not be possible in all environments, or the range will suffer. High rate multiple input, multiple output (MIMO) transmission requires rich scattering environments to work well, but in these kinds of environments the attenuation is strong and consequently the range is small.

U.S. Pat. No. 5,345,599 describes a distributed transmission, directive reception system that applies macroscopically distributed MIMO (multiple input, multiple output) transmission using wireline links to distribute the streams to the macroscopically separated transmitters. However, the spatially distributed transceivers in this system are connected with wireline to the base station, making it very expensive to deploy.

U.S. Pat. No. 6,067,290 describes a system with distributed transmission of multi-streams to/from one user equipment (UE) to multiple base stations (BSs). However, in such a system, coverage becomes a problem as deploying wired BSs is very expensive. In addition, macro diversity and multiplexing in this system requires extensive signaling between BSs over the core network.

Thus, there is a need for improved high data rate transmission in multiple input, multiple output (MIMO)networks. Further, there is a need for a wireless multi-hop system with macroscopic multiplexing. Even further, there is a need to achieve high data rates in wireless communication systems at relatively low costs.

SUMMARY OF THE INVENTION

The present invention is directed to a method, device, and system in which radio links between relays and users are optimized separately from the links between relays and base stations and in which multiple simultaneous data streams between relays and base stations are created. The system includes transceivers of at least three kinds with at least two kinds of radio interfaces. The first kind of transceiver, a base station (BS), is connected to the core network with a link of wire line quality. A wire line quality link may be realized using a wireless communication link, whenever the communication capacity of the wireless link is sufficient to reliably carry all communication between the BS and the core network. The capacity of the first radio interface may not be sufficient to reliably carry all communication between the RS and BS. The second kind of transceiver, a relay station (RS), is connected to the BS with a first radio interface, and to the third kind, the user equipment (UE), with a second radio interface. The first and second radio interfaces can operate, at least in part, using the same frequency bandwidth. The UE can also connect directly to the BS using the second radio interface if the channel to/from the BS is better that the channel to/from any RS.

Briefly, one exemplary embodiment relates to a method for communicating in a wireless multi-hop system having at least one base station, at least one relay station, and user equipment. The method includes communicating between a relay station and a base station using a first radio interface, communicating between user equipment and the relay station using a second radio interface, and processing the communication between the relay station and the base station with the first radio interface separately from the communication between user equipment and the relay station.

Figure 8:
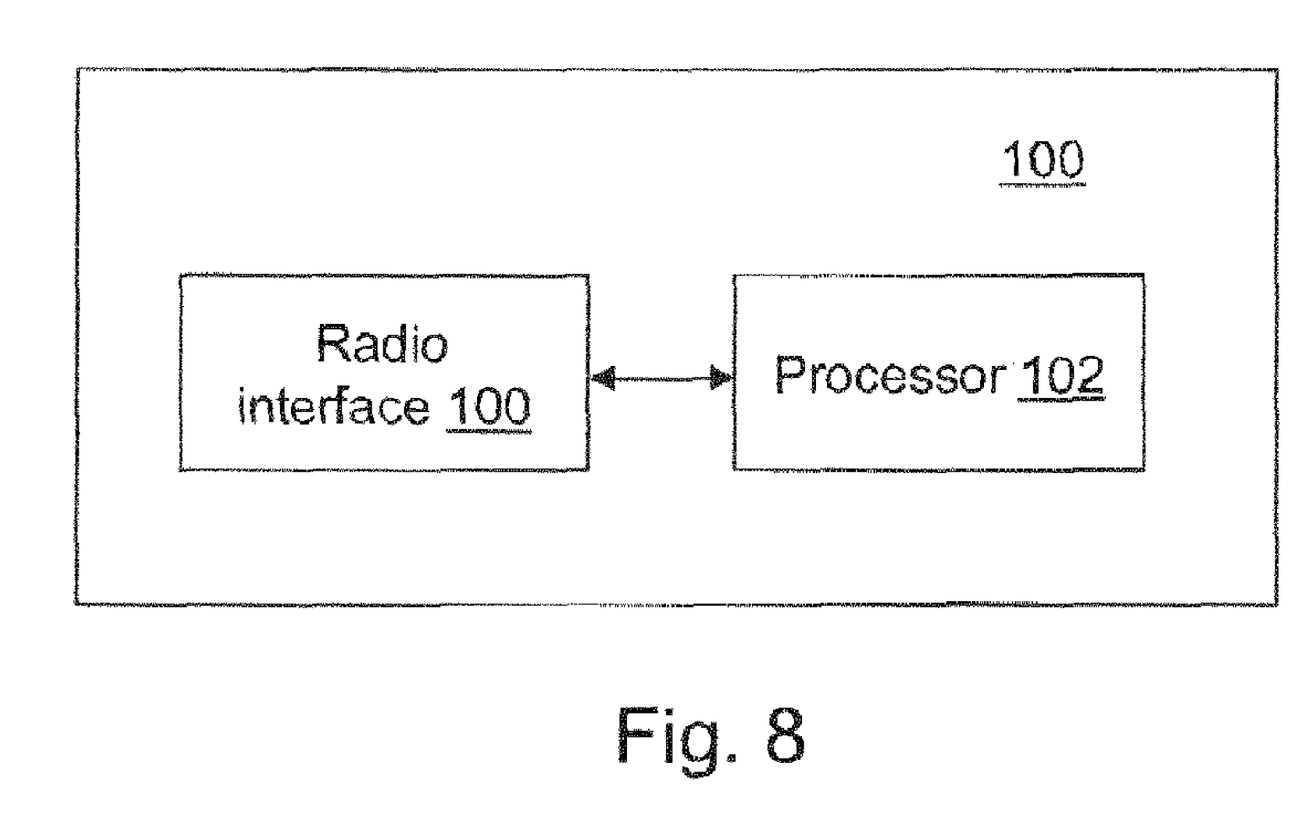
FIG. 8 is a block diagram of a device in accordance with an exemplary embodiment.

Another exemplary embodiment relates to a device configured for operation in a wireless multi-hop communication environment. With reference to FIG. 8, the device 100 includes a radio interface 100 that communicates with relay stations in a multi-hop communication environment and a processor 102 coupled to the radio interface. The processor 102 provides commands for multiple-input multiple output communication via the radio interface when high data rates are needed.

Yet another exemplary embodiment relates to a wireless communication system having a base station and a relay station that communicate with user equipment. The system includes a base station having a first radio transceiver and being connected to a core network, a relay station having a second radio transceiver and being configured to communicate with the base station using a first radio interface, and user equipment having a third radio transceiver and being configured to communicate with the relay station using a second radio interface. The operation of the first radio interface and the second radio interface are separate from each other.

Other principle features and advantages of the invention will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings.

DETAILED DESCRIPTION OF EXEMPLARY EMBODIMENTS

Figure 1:
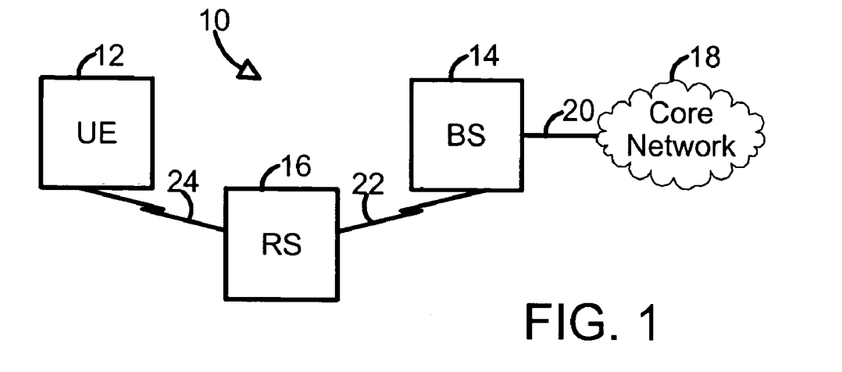
FIG. 1 is a diagrammatic representation of a communication system in accordance with an exemplary embodiment.

FIG. 1 illustrates a communication system 10 having a user equipment (UE) 12, a base station (BS) 14, a relay station (RS) 16, and a core network 18. The base station 14 is connected to the core network 18 with a wire line 20 having wire line quality. The relay station 16 is connected to the base station 14 by a radio interface 22 and the relay station 16 is connected to the UE 12 by a radio interface 24. In some embodiments, the radio interface 22 and the radio interface 24 operate, at least in part, using the same frequency bandwidth. In at least some radio interfaces, a macroscopic multiplexing is utilized, where the relay station 16 is connected to the base station 14 both directly and via another relay station. In at least some other radio interfaces, a multiple input, multiple output (MIMO) transmission is used.

Figure 2:
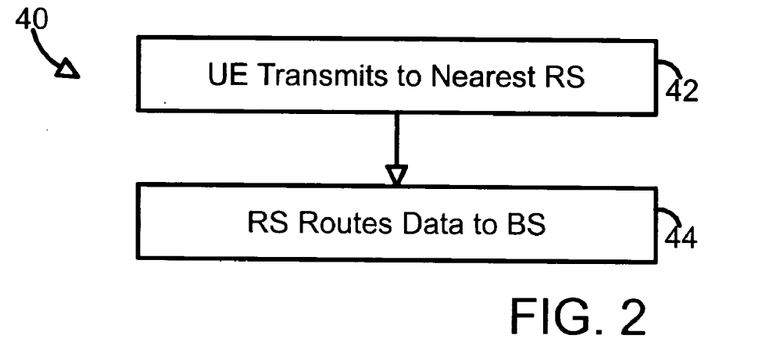
FIG. 2 is a flow diagram depicting operations in a wireless multi-hop system with macroscopic multiplexing in accordance with an exemplary embodiment.

FIG. 2 illustrates a flow diagram 40 of exemplary operations in a wireless multi-hop system with macroscopic multiplexing. Additional, fewer, or different operations may be performed in accordance with alternative embodiments. In an operation 42, user equipment (UE) transmits to the relay station (RS) which has the best channel quality, as measured by some suitable quantity. The UE communicates with the RS at a particular radio frequency.

In an operation 44, the RS routes the data received from the UE to a base station (BS). The RS can route the data directly to the BS and to the BS via another RS. This macroscopic multiplexing of data creates multiple simultaneous data streams. Such multiple streams ensure that the high data rates available at the links between UE and RS/BS can be realized also in the links between RS/RS and RS/BS without resorting to very high order modulations.

Figure 3:
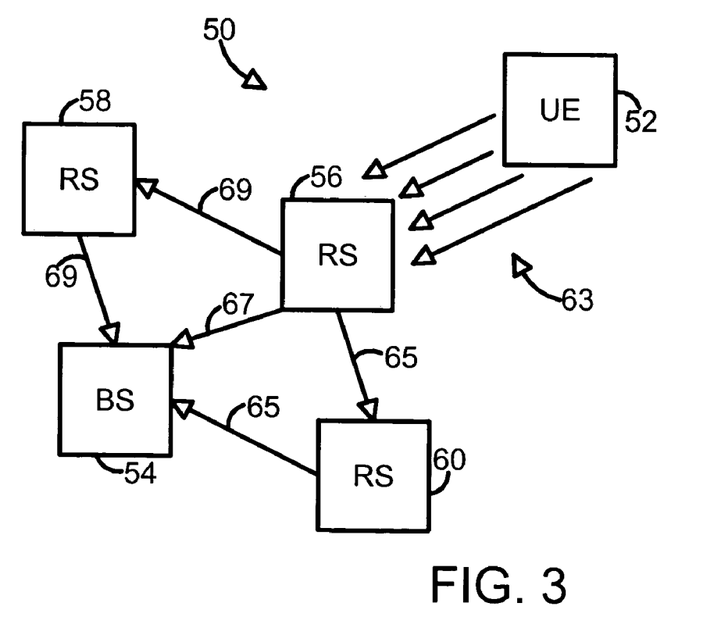
FIG. 3 is a diagrammatic representation of a communication system having multiplexing between relay stations and base stations in accordance with an exemplary embodiment.

FIG. 3 illustrates a communication system 50 having user equipment (UE) 52, a base station (BS) 54, and relay stations RS 56, RS 58, and RS 60. FIG. 3 illustrates an uplink transmission in the system 50 using arrows between devices in the system. The UE 52 transmits data to the nearest RS (RS 56) using four parallel streams 63. Each of the four parallel streams 63 is modulated with 16-QAM transmission, for example. The RS 56 routes this data to the BS 54 using three different routes 65, 67, and 69. Routes 65 and 69 can be 64-QAM modulated and route 67 is 16-QAM modulated, so that the data rate between the UE/RS link 63 is the same as the data rate between the macroscopically multiplexed RS/BS link comprised of 65, 67, and 69. Therefore, the RS or BS do not need very high order modulation to achieve the same high data rates, resulting in reduced hardware complexity and alleviation of the peak-to-average problem.

In an exemplary embodiment, the multiple antennas utilized at the relay stations or base station can also be used to create transmissions with high directivity, such as beamforming. This reduces the interference between different cells or within one cell.

A relay station can communicate simultaneously with multiple base stations. Due to this, in an exemplary embodiment, all operations related to a user in soft handoff can be handled in a single base station. In a prior art network with single-hop radio links, macro diversity or multiplexing in downlink requires the network to split or duplicate the data intended to a user in softhandoff, to communicate the parts of the message to multiple BSs, and the BSs to transmit them to the UE. In an uplink operation, multiple BSs listen to the UE, the results are conveyed to the network, and combined there. In an exemplary embodiment, a RS is connected to a primary BS, but it is also connected to all the primary BSs of neighboring RSs. These form the set of secondary BSs of the RS. Thus, a RS that is surrounded by RSs connected to the same primary BS, would only be connected to its primary BS. A RS that is adjacent to a cell border has at least one neighboring RS that is connected to a different primary BS, and, thus, is connected to at least one secondary base station. A UE that is in soft handoff between at least two cells communicates with at least two RSs, which are primarily connected to at least two different BSs. When relaying information pertaining to the UE in soft handoff, all RSs involved communicate with a single BS, using primary/secondary BS/RS links accordingly. With this method, the handling of UEs in soft handoff becomes completely local, and transparent to the network. Splitting/duplicating/combining data is performed in a single BS.

The communication system 50 can be implemented in a variety of different ways. The communication system 50 can exploit the borders of two different radio environments. For example, the relay and base stations can be placed in rooftops so that the links between them are close to line-of-sight links, which provide higher reliability and longer range. On the other hand, if the users are mainly located in street level, where the propagation environment is much more rich, the links between UE and RS/BS offer better potential for high rate MIMO transmission, which is not possible with line-of sight links. Other possible situations where the different links can be separately optimized are transitions between outdoor and indoor environments.

Using the communication system 50, the link between the UE 52 and the RS 56 can be optimized separately from the link between the RS 56 and RS 58, RS 60, or BS 54. The optimization can be done, for example, by planning the locations of the RS 56, RS 58, RS 60 and BS 54, using such coding, modulation, duplexing, multiple access of other transmission and/or receive methods which are optimal to the expected channel conditions. Furthermore, if the locations of the RS are fixed or moving along fixed paths at known speeds, (such as trains) the channel conditions between the BS and the RS are known to both sides of the link. Therefore, performance optimizing transmission methods which require full channel knowledge at the transmitter can be used without need for channel feedback. The separate optimization allows the range between RS and BS to be increased. Thus, lower density of RS and BS is required. Moreover, there is better performance in the links between UE 52 and RS 56 because of the shorter distance, resulting in decreased power consumption by the UE 52. Also, the location of RS 56 can be planned so that there is high possibility for channel conditions allowing high rate MIMO transmission, e.g. transmission of maximum number of spatially multiplexed parallel data streams between the UE 52 and RS 56 is possible with the required error rate and transmission power.

In an alternative embodiment, the UE 52 is connected to several relay stations, using a relay station specific pilot signal. Code, frequency, or time may be used to separate the signals from different relay stations. In such a system, the UE 52 measures MIMO channels to multiple RS, preferably over an integration window consisting of multiple symbol periods. The spatial eigenmodes with largest eigenvalues are chosen. If the largest eigenmodes belong to different RSs, sufficient interference nulling is taken into account when calculating the eigenbeams. The RSs may be connected to different primary base stations. The RS selection may be performed by the UE when in idle mode.

In yet another alternative embodiment, the multi-path propagation environment and the resulting multi-path interference may be different for different categories of links in the network. Thus, if directive antennas are used in RS/RS and RS/BS links, in near line-of-sight conditions, the resulting links are single path. As such, advanced multi-carrier modulation (e.g., OFDM) may not be needed for these links. The RS/RS and RS/BS links may apply spread-spectrum transmission (code spreading), or OFDM with less multi-carriers and possibly shorter guard period than the RS/UE link.

In an alternative embodiment, the communication system 50 may apply FDD (frequency division duplex) or TDD (time division duplex) in the different categories of links. Moreover, the independence of the communication links in the communication system 50 has the advantage that the duplexing need not be the same for each link. Preferably, operations in the relay stations of different categories of links are separated. Such scheduling may be based on time division, frequency division, code division, or spatial division/interference suppression, or a combination thereof. One way to implement such time division scheduling at the relay station is that when the RS is scheduled for reception or transmission on a RS/(RS or BS) link, it suppresses actions on the RS/UE links. Scheduling can be implemented at the base station by the base station choosing which RS(s) are active on a particular link and at what rate.

Depending on the rate and/or topology, a given active RS may employ a number of neighboring RSs as "slaves," or devices operating at the instruction of the RS. In time division scheduling of the RS, all other RSs may schedule RS/UE transmissions when they are not participating in a RS/(RS or BS) transmission. Thus, for example, in the situation depicted in FIG. 4, at a time instant 1, RS 80 is participating in a RS/RS, RS/BS link (labeled Data 2.3) between RS 78 and BS 74. The transmissions to/from RS 78, RS 80, and BS 74 are typically directed away from the RS 76 not participating in the RS/(RS or BS) operation. Thus, RS/UE transmissions in the subcell covered by RS 76 are not be disturbed by RS/(RS or BS) links. In FIG. 5, at a time instant 2, RS 80 is instead participating in relaying information from RS 76 to BS 74. At the time when a RS is not transmitting data, for example RS 76 in FIG. 4, it can still be receiving and processing data from UE 72. At the next instant (FIG. 5.), RS 76 transmits the data (labeled Data 1.2 and Data 1.1) which it has received during the previous time instant from UE 72. This will reduce the delays, since the time required for the data processing at RS 76 is utilized by RS 78.

Figure 4:
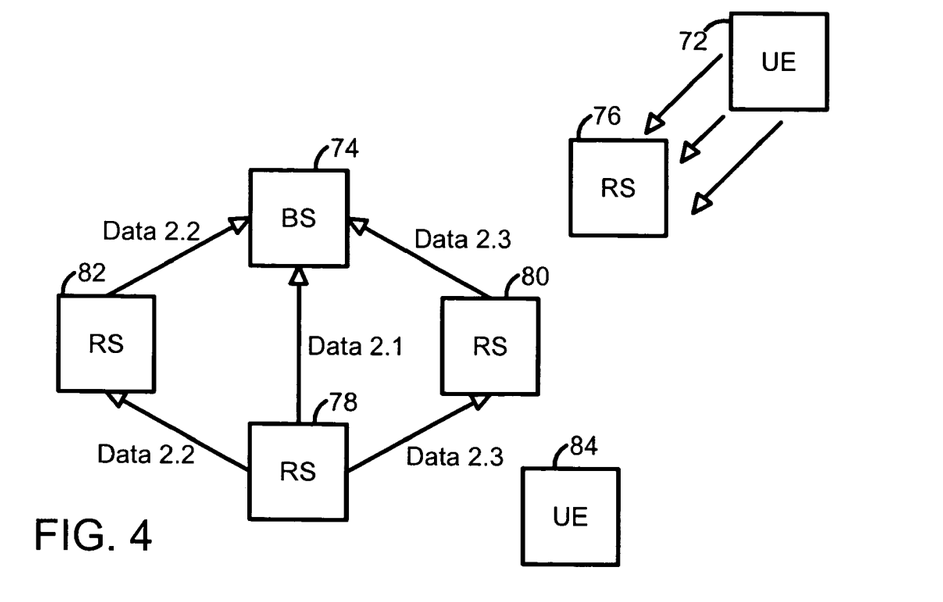
FIG. 4 is a diagrammatic representation of time division scheduling of communication links between user equipment (UE) and a relay station and the relay station and other stations at a time instant one in accordance with an exemplary embodiment.
Figure 5:
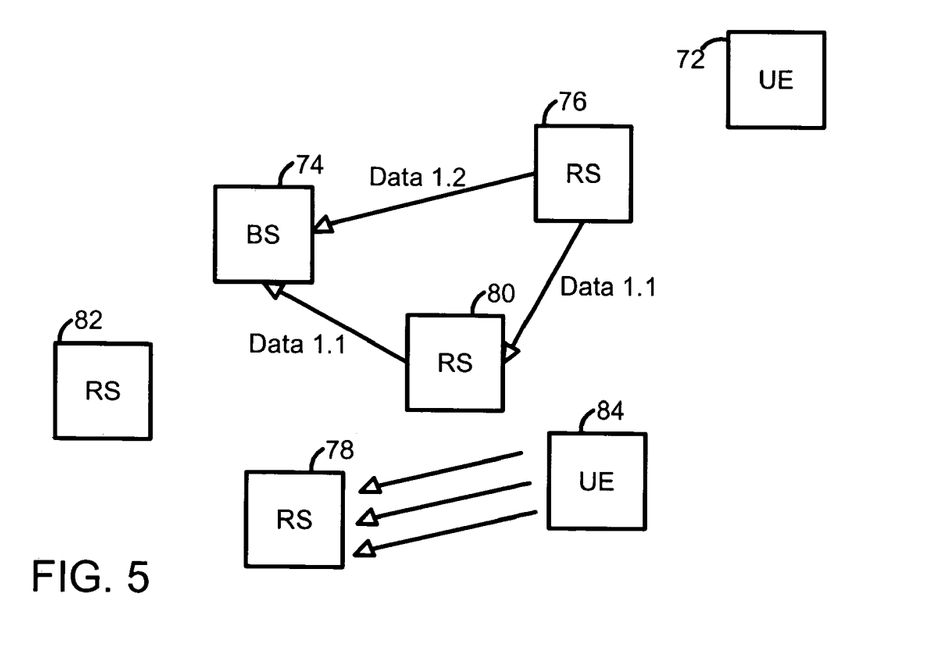
FIG. 5 is a diagrammatic representation of the time division scheduling of FIG. 4 at a time instant two in accordance with an exemplary embodiment.

The duplexing mode described with respect to FIGS. 4 and 5 may be connected with using a dynamic reuse technique. Reuse means dividing some orthogonal resources (time, frequency, codes) between each cell or subcell in such a way that the interference coming from neighboring cells is reduced. The cells/subcells are divided into fixed number of groups (e.g. reuse factor) so that the distance between cell belonging to one group is maximized, an each group is assigned one part of the orthogonal resources. For example, if the reuse is done in time with reuse factor three, at first instant the cells/subcells in group one are active, at time instant two the second group is active and at time instant three the third group. The reuse can be made dynamic, so that it is possible to assign more orthogonal resources to one group than the others, and that the assignment may be changed when required.

The dynamic reuse in the case depicted in FIGS. 4 and 5 can be implemented by configuring the system so that neighboring subcells do not participate in RS/UE transmission simultaneously or using the same resources. Also, the reuse can be changed dynamically, for example adjusting the length of the time instants, or assigning RS to different reuse groups as needed. If RS 80 in FIGS. 4 and 5 is first assigned to the reuse group consisting of RS 78, RS 82 and BS 74, and in the next ime instant to the group consisting of RS 76 and BS 74. This improves the operation of RS/UE links because the interference from neighboring subcells is suppressed and the resources can be utilized flexibly. Due to the lower average transmission powers needed in the RS/UE links, as compared to a direct UE/BS link, and the fact that even with dynamic reuse, multiple RS/UE links may be active simultaneously within a cell, this reuse does not necessarily diminish the peak data rates or the capacity of the whole system.

Figure 6:
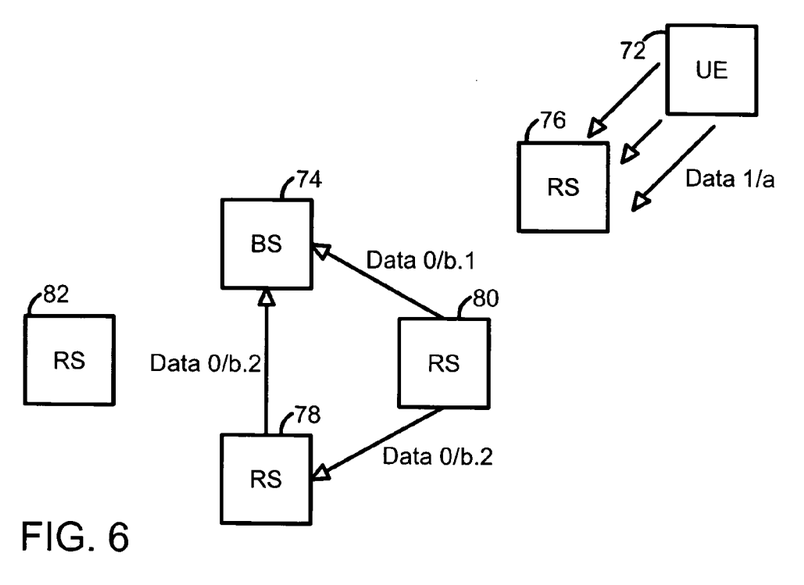
FIG. 6 is a diagrammatic representation of full rate operation of a user at a time instant one in accordance with another exemplary embodiment.
Figure 7:
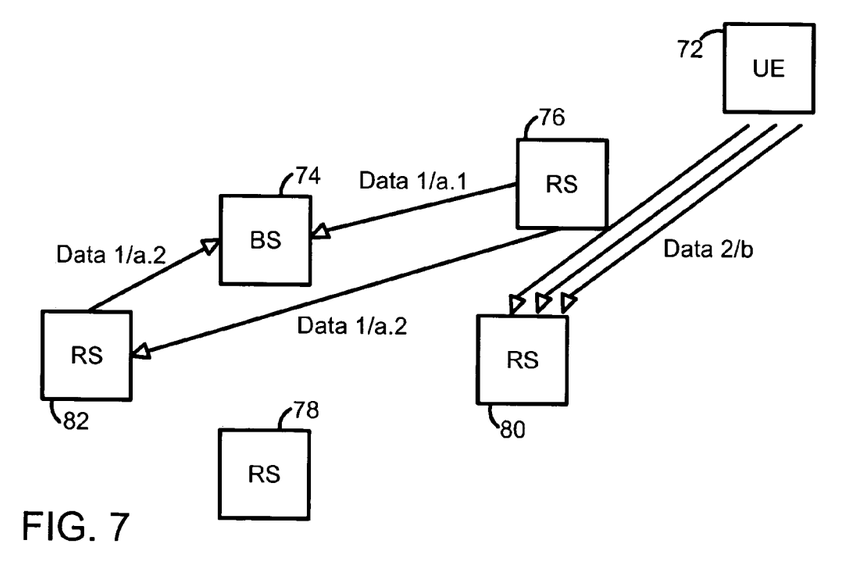
FIG. 7 is a diagrammatic representation of the full rate operation of FIG. 6 at a time instant two in accordance with another exemplary embodiment.

When and if a user with very high data rate requirements needs the full bandwidth, it may use it. FIGS. 6 and 7 illustrate an example of a high data rate user 72. Because of dynamic reuse, it is possible to configure the system so that the high data rate UE 72 can use both time instants one (FIG. 6) and time instant two (FIG. 7) to transmit the data. Even if RS 78 is further away than RS 76, the power needed to create a link between UE 72 and RS 78 can still be less than if a direct link between UE 72 and BS 74 were created. Multi-hop topology and dynamic reuse increases system capacity considerably.

In an alternative embodiment, different multiple access methods may be used in different categories of links in the network. In particular, the delays of RS/RS and RS/BS links are fixed, making a synchronized (orthogonal) CDMA transmission possible in all directions in these links. In contrast, TDMA/OFDMA may be used between UE and RS. Orthogonal CDMA in RS/RS and BS/RS may be applied based on a clock at BS that synchronizes the transmissions of the BS. During the setup of the network, the RSs measure delays of transmissions to (possible many) BS and other RSs. In operation, the RSs synchronize transmissions to BS(s) and other RSs so that all transmissions arriving at a BS or RS on the BS/RS and RS/RS links are synchronized. Preferably, multi-code transmissions are allowed for CDMA links as to not compromise peak data rates. The transmissions on different RS/(RS or BS) links may be identified by different scrambling codes. If the full spectral efficiency is not used in different simultaneous transmissions, interference is reduced. The benefits of synchronized CDMA persist if the scrambling codes are chosen based on the identity of the receiving end of the radio link.

Advantageously, the system and method described reduces complexity in scheduling. The base station takes care of higher level scheduling and retransmission protocols. Transmissions in BS/RS links may be scheduled based on the combined reward functions of all users connected to a RS. A reward function is a measure based on the which the scheduler can determine the optimal way of scheduling the transmission/reception, for example so that the user with the largest reward function is allowed to transmit. The reward function can depend for example on the channel quality, expected error rate, delay requirements, Quality of Service requirements, priority class or some other measures related to the transmission of one user. The RS takes care of scheduling the users connected to it, leading to considerable complexity reduction. As an example, where there are 256 users in a cell, the BS has to compute 256 reward functions to schedule these without assistance from relay stations. In contrast, if there are 16 relay stations, each with 16 users, each RS schedules 16 users, and each BS schedules 16 relay stations, based on combined reward functions.

Other advantages of the system and method described include the flexibility that single or multiple hops may be used. Furthermore, for the RS/BS and RS/RS links, directive transmission, e.g., SDMA, can be used to reduce interference. If duplexing of the different kinds of links is arranged as suggested above, the RS may use the time it is waiting for an uplink slot towards the BS to process the data received from the UE. By dividing the functionalities of the medium access control (MAC) layer between BS and RS, as discussed above for scheduling, further complexity reduction and delay minimization may be achieved. Thus, for example, automatic retransmission request protocols (ARQ) may be split between the BS/RS and RS/UE links so that different cyclic redundancy checks (CRC) are performed after transmission over the at least two kinds of radio interfaces.

This detailed description outlines exemplary embodiments of a method, device, and system for wireless multi-hop with macroscopic multiplexing. In the foregoing description, for purposes of explanation, numerous specific details are set forth in order to provide a thorough understanding of the present invention. It is evident, however, to one skilled in the art that the exemplary embodiments may be practiced without these specific details. In other instances, structures and devices are shown in block diagram form in order to facilitate description of the exemplary embodiments.

While the exemplary embodiments illustrated in the Figures and described above are presently preferred, it should be understood that these embodiments are offered by way of example only. Other embodiments may include, for example, different techniques for performing the same operations. The invention is not limited to a particular embodiment, but extends to various modifications, combinations, and permutations that nevertheless fall within the scope and spirit of the appended claims.

What is claimed is:

1. A method for communicating in a wireless multi-hop system having at least one base station, at least one relay station, and user equipment, the method comprising:
   facilitating, at a first relay station, a communication between user equipment and the first relay station using a second radio interface; and
   multiplexing the communication between the first relay station and a base station and between the first relay station and a second relay station using a first radio interface to create a plurality of simultaneous data streams; and
   processing the communication between the first relay station and the base station with the first radio interface separately from the communication between the user equipment and the first relay station.

2. The method of claim 1, further comprising communicating the communication between the second relay station and the base station.

3. The method of claim 2, wherein the second relay station communicates directly with the base station.

4. The method of claim 1, further comprising dynamically reusing communication resources between the user equipment and the first and second relay stations.

5. The method of claim 1, wherein communicating between user equipment and the first relay station comprises communicating a relay station specific pilot signal.

6. The method of claim 1, wherein the second radio interface comprises multiple input multiple output transmissions.

7. The method of claim 1, wherein the first radio interface and the second radio interface operate using a common frequency bandwidth.

8. The method of claim 1, wherein the first radio interface comprises a macroscopic multiplexing.

9. The method of claim 1, further comprising sharing resources between communication using the first radio interface and communication using the second radio interface, wherein the first radio interface and the second radio interface operate using different categories of communication links.

10. The method of claim 9, wherein the different categories of communication links are selected from multi-carrier modulation, spread-spectrum transmission, frequency division duplexing, and time division duplexing.

11. A wireless communication system having a base station and a relay station that communicate with user equipment, the system comprising:
 a base station having a first radio transceiver and being connected to a core network; and
 a first relay station having a second radio transceiver and being configured to simultaneously communicate with the base station and with a second relay station using a first radio interface and being configured to communicate with user equipment having a third radio transceiver using a second radio interface, wherein the operation of the first radio interface and the second radio interface are separate from each other.

12. The system of claim 11, wherein the operation of the first radio interface and the second radio interface includes, at least in part, using the same frequency bandwidth.

13. The system of claim 11, further comprising the second relay station configured to communicate with the base station.

* * * * *